US012039228B2

(12) United States Patent
Hisatomi et al.

(10) Patent No.: US 12,039,228 B2
(45) Date of Patent: Jul. 16, 2024

(54) ELECTRONIC DEVICE AND NON-TRANSITORY STORAGE MEDIUM

(71) Applicants: Hisense Visual Technology Co., Ltd., Shandong (CN); TVS REGZA Corporation, Misawa (JP)

(72) Inventors: Shuichi Hisatomi, Misawa (JP); Yu Onodera, Misawa (JP); Gen Omura, Misawa (JP); Hayato Nishimura, Misawa (JP); Toshihiro Sawaoka, Misawa (JP); Tetsuya Kitamura, Misawa (JP)

(73) Assignees: Hisense Visual Technology Co., Ltd., Qingdao (CN); TVS REGZA Corporation, Misawa (JP)

( * ) Notice: Subject to any disclaimer, the term of this patent is extended or adjusted under 35 U.S.C. 154(b) by 273 days.

(21) Appl. No.: 17/644,536

(22) Filed: Dec. 15, 2021

(65) Prior Publication Data

US 2022/0107781 A1   Apr. 7, 2022

Related U.S. Application Data

(63) Continuation of application No. PCT/CN2020/121423, filed on Oct. 16, 2020.

(30) Foreign Application Priority Data

Oct. 29, 2019   (JP) .................. 2019-196719

(51) Int. Cl.
*G06F 3/0482*   (2013.01)
*G06F 3/16*   (2006.01)
*G10L 15/22*   (2006.01)

(52) U.S. Cl.
CPC ............ *G06F 3/167* (2013.01); *G06F 3/0482* (2013.01); *G10L 15/22* (2013.01); *G10L 2015/223* (2013.01)

(58) Field of Classification Search
CPC ....... G06F 3/167; G06F 3/0482; G10L 15/22; G10L 2015/223

(Continued)

(56) References Cited

U.S. PATENT DOCUMENTS

2003/0078784 A1\* 4/2003 Jordan ............... H04N 21/4316
704/E15.04
2014/0181672 A1   6/2014 Zhang et al.

FOREIGN PATENT DOCUMENTS

CN   103885662 A   6/2014
CN   104898625 A   9/2015

(Continued)

OTHER PUBLICATIONS

International Search Report, mailed Jan. 22, 2021, for PCT Application No. PCT/CN2020/121423 filed Oct. 16, 2020.

(Continued)

*Primary Examiner* — George C Monikang
(74) *Attorney, Agent, or Firm* — ANOVA LAW GROUP, PLLC

(57) ABSTRACT

The present application relates to an electronic device and a non-transitory storage medium. The electronic device of the embodiments includes a display processing unit and a voice operation processing unit. The display processing unit is configured to display on the display unit a first operation image including presentation of an operation item for operation input; if a predetermined condition is satisfied in the presentation of the first operation image, a second operation image is displayed on the display, the second operation image being an operation image in which text information corresponding to the operation item in the first operation image is highlighted. In the presentation of the second operation image, the voice operation processing unit is configured to receive the voice operation input correspond- (Continued)

ing to the text information highlighted in the second operation image as an operation on the video apparatus.

20 Claims, 8 Drawing Sheets

(58) Field of Classification Search
USPC ........................................ 704/231, 246, 251
See application file for complete search history.

(56) References Cited

FOREIGN PATENT DOCUMENTS

| CN | 105045828 A | 11/2015 |
|---|---|---|
| CN | 106910503 A | 6/2017 |
| EP | 2986014 A1 | 2/2016 |
| JP | H11232438 A | 8/1999 |
| JP | 2005242183 A | 9/2005 |
| JP | 2007171809 A | 7/2007 |
| JP | 2009125077 A | 6/2009 |
| JP | 2012208837 A | 10/2012 |
| JP | 2017204745 A | 11/2017 |
| JP | 2019053461 A | 4/2019 |
| WO | 2014007020 A1 | 1/2014 |

OTHER PUBLICATIONS

Chinese Office Action, mailed 2022, from Chinese App. No. 202080004679.5.
Chinese Office Action, mailed Nov. 3, 2022, from Chinese App. No. 202080004679.5.
Japanese Search Report, mailed Aug. 31, 2022, from Japanese App. No. 2019-196719.

* cited by examiner

ELECTRONIC DEVICE AND NON-TRANSITORY STORAGE MEDIUM

The present application is a continuation application of International Application No. PCT/CN2020/121423, filed Oct. 16, 2020, which claims the priority from Japanese Patent Application No. 2019-196719, filed with the Japan Patent Office on Oct. 29, 2019 and entitled "Electronic Device and Program", the entire content of which is hereby incorporated by reference.

FIELD

The embodiments of the present application relate to an electronic device and a non-transitory storage medium.

BACKGROUND

Conventionally, the technology of performing game operations by voice input is known.

SUMMARY

The above-mentioned voice input can be used not only for the game operation, for example but also for the technology of remotely operating a video apparatus such as a television and a video recorder by performing a voice operation input to an electronic device such as a smart phone. In this case, it is desired to reduce the load (degrees of difficulty) of the voice operation input to the electronic device and improve the convenience.

The electronic device of embodiments includes a display processing unit and a voice operation processing unit. The display processing unit is configured to display a first operation image including presentation of an operation item for operation input on a display unit and display a second operation image on the display unit in response to the first operation image satisfying a predetermined condition, where the second operation image is an operation image in which the text information corresponding to the operation item in the first operation image is highlighted. The voice operation processing unit is configured to receive a voice operation input corresponding to the text information highlighted in the second operation image as an operation on a video apparatus while the second operation image is displayed.

DESCRIPTION OF REFERENCE NUMERALS

100 Information terminal (Electronic device), 104 Display unit, 120 video apparatus, 121 Video recorder (video apparatus), 122 Television (video apparatus), 312 Display processing unit, 314 Voice operation processing unit.

DETAILED DESCRIPTION OF THE EMBODIMENTS

Embodiments and variants of the present application will be illustrated below based on the drawings. The configurations of embodiments and variants as well as the actions and effects produced by the configurations described below are merely examples, and are not limited to the following description.

EMBODIMENTS

Figure 1A:
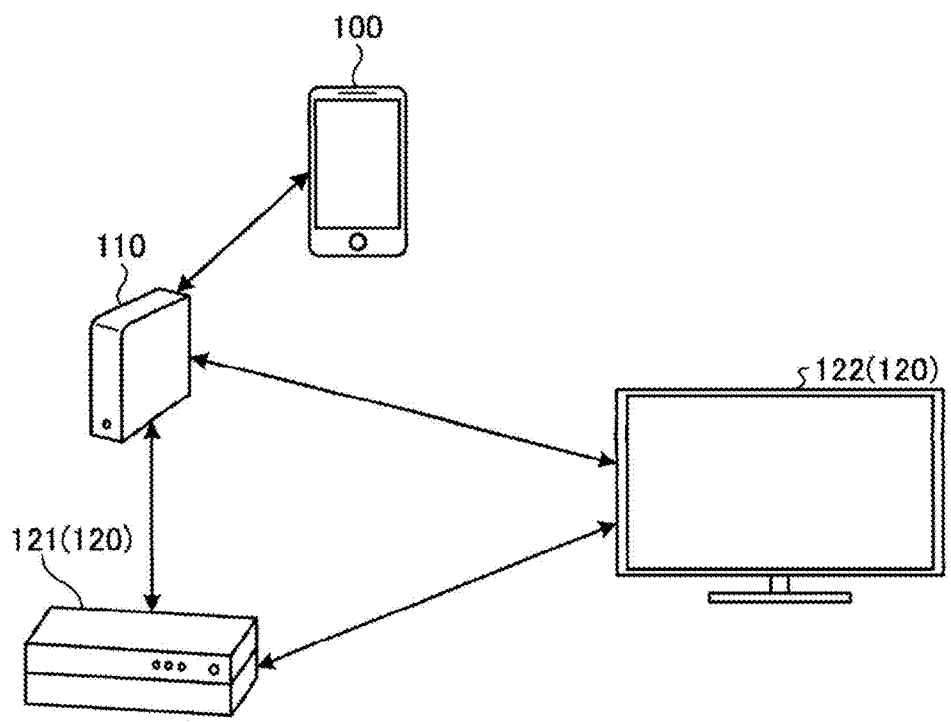
FIG. 1A is a schematic diagram showing an example of a situation where the technology of an embodiment is applied.

FIG. 1A is a schematic diagram showing an example of a situation where the technology of an embodiment is applied.

As shown in FIG. 1A, the technique of embodiments is applied as an example to a situation where an information terminal 100 such as a smartphone is used to remotely operate a video apparatus 120 such as a video recorder 121 and a television 122. The information terminal 100 is an example of "electronic device".

In some embodiments, as shown in FIG. 1A, the information terminal 100 and the video apparatus 120 can be in communication connection with each other via a relay device 110 such as a router. However, in some embodiments, the information terminal 100 and the video apparatus 120 may also be connected via a network such as Internet.

In addition, the technique of embodiments can also be applied to the situation shown in FIG. 1B below.

Figure 1B:
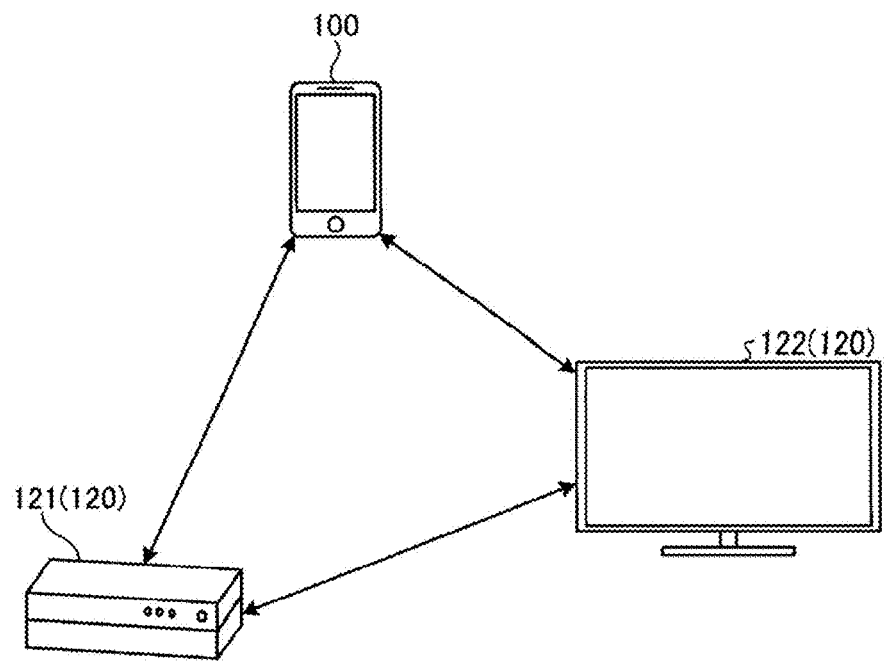
FIG. 1B is a schematic diagram showing another example of a situation where the technology of an embodiment is applied.

FIG. 1B is a schematic diagram showing another example of a situation where the technology of an embodiment is applied. In some embodiments, as shown in FIG. 1B, the information terminal 100 and the video apparatus 120 are directly (peer-to-peer) connected without the relay device 110. The technology of embodiments can also be applied to a situation where the video apparatus 120 is remotely operated by the information terminal 100 based on such connection.

Figure 2:
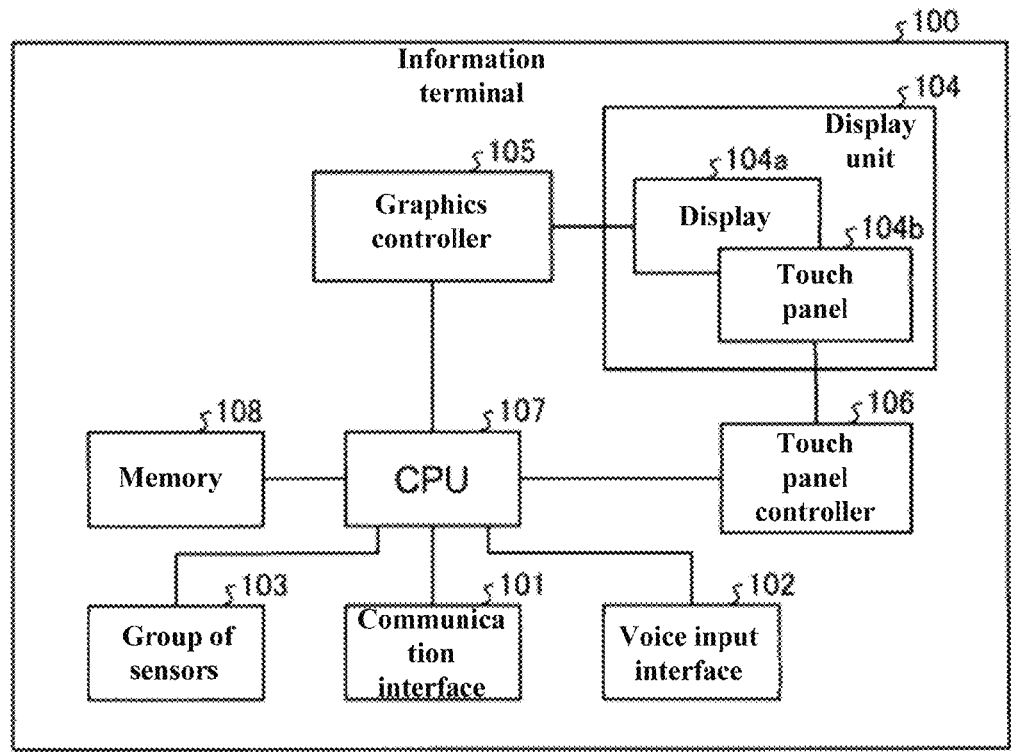
FIG. 2 is a schematic diagram showing the hardware configuration of an information terminal in an embodiment.

The information terminal 100 shown in FIGS. 1A and 1B has the following hardware configuration as shown in FIG. 2.

FIG. 2 is a schematic diagram showing the hardware configuration of the information terminal in an embodiment.

As shown in FIG. 2, the information terminal 100 includes a communication interface (I/F) 101, a voice input interface 102, a group of sensors 103, a display unit 104, a graphics controller 105, a touch panel controller 106, a Central Processing Unit (CPU) 107, and a memory 108. In addition, the information terminal 100 may also include a camera and a speaker, etc.

The communication interface 101 is a component used for communication with other devices such as the video apparatus 120 via the relay device 110 or the like.

The voice input interface 102 is a voice input device such as a microphone, and detects the voice input of the user of the information terminal 100.

The group of sensors 103 includes, for example, at least any one of an acceleration sensor, an orientation sensor, a gyroscope sensor, etc. The acceleration sensor is a sensor device configured to detect the direction and magnitude of the acceleration of the information terminal 100 when the information terminal 100 is moved. And, the orientation sensor is a sensor device configured to detect the orientation of the information terminal 100. In addition, the gyroscope sensor is a sensor device configured to detect the angular velocity of the information terminal 100 when the information terminal 100 is rotated.

The display unit 104 is configured as a so-called touch panel device in which a display 104*a* and a touch panel 104*b* are combined. The display 104*a* may be, for example, an LCD (Liquid Crystal Display) or an organic EL (Electro Luminescence) display, etc. The touch panel 104*b* detects a touch position on the display screen of the display 104*a* touched by a user's finger, a touch pen, etc.

The graphics controller 105 controls the display 104*a* of the display unit 104. The touch panel controller 106 controls the touch panel 104*b* of the display unit 104, and obtains the coordinate data representing the touch position on the display screen touched by the user from the touch panel 104*b*.

The CPU 107 controls various components of the information terminal 100 by executing various computer programs. The memory 108 includes a ROM (Read Only Memory), a RAM (Random Access Memory), etc., and stores various computer programs and various data used in various arithmetic processes executed by the CPU 107.

With the above hardware configuration, embodiments realize using the information terminal 100 to remotely operate the video apparatus 120. In some embodiments, the information terminal 100 sends an instruction for the video apparatus 120 via the communication interface 101 according to the user's manual operation input detected via the touch panel 104*b* or the user's voice operation input detected via the voice input interface 102, and the video apparatus 120 operates according to the instruction from the information terminal 100.

Here, in a case where the voice operation input is done at the information terminal 100 to operate the video apparatus 120, it is desired to reduce the load (difficulties) of the voice operation input for the information terminal 100 and improve the convenience.

Therefore, in an embodiment, the information terminal 100 (and the video apparatus 120) has the functions shown in FIG. 3 below, thereby reducing the load (difficulties) of the voice operation input for remotely operating the video apparatus 120 via the information terminal 100 and improving the convenience.

Figure 3:
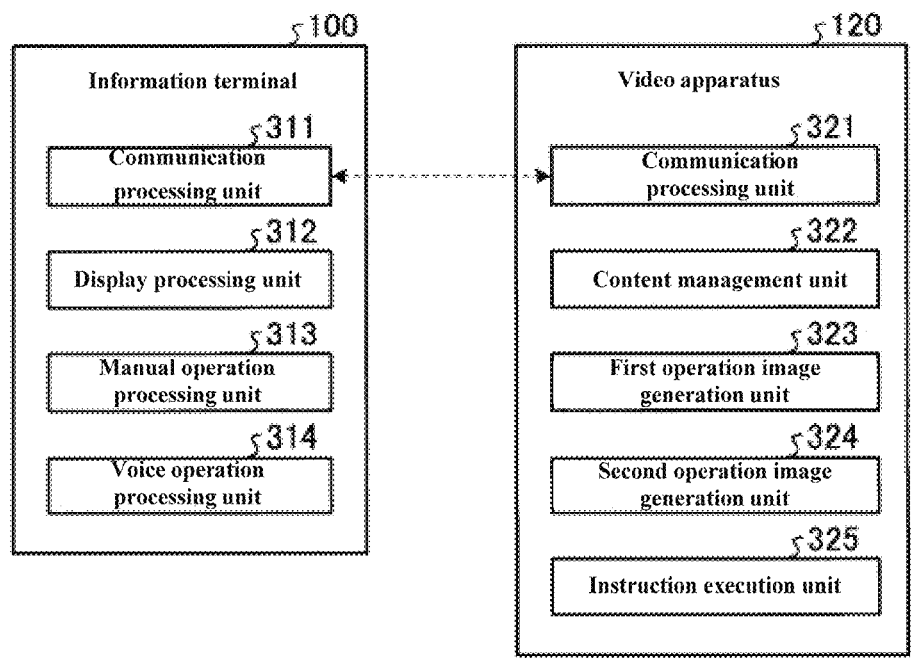
FIG. 3 is a schematic block diagram showing the functions of the information terminal and a video apparatus in an embodiment.

FIG. 3 is a schematic diagram showing the functions of the information terminal 100 and the video apparatus 120 in an embodiment.

The information terminal 100 includes a communication processing unit 311, a display processing unit 312, a manual operation processing unit 313, and a voice operation processing unit 314.

The communication processing unit 311 uses the communication interface 101 to control the communication with the video apparatus 120. The display processing unit 312 uses the graphics controller 105 to control the display 104*a*.

The manual operation processing unit 313 performs the control related to the user's manual operation input via the touch panel 104*b*. The voice operation processing unit 314 performs the control related to the user's voice operation input via the voice input interface 102.

In some embodiments, the video apparatus 120 includes a communication processing unit 321, a content management unit 322, a first operation image generation unit 323, a second operation image generation unit 324, and an instruction execution unit 325.

The communication processing unit 321 controls the communication with the information terminal 100. Furthermore, the content management unit 322 manages the content (for example, recorded video, etc.) recorded in the video apparatus 120.

The first operation image generation unit 323 generates a touch operation image as a first operation image that should be displayed on the information terminal 100 in order to receive the user's manual operation input. The second operation image generation unit 324 generates a voice operation image as a second operation image that should be displayed on the information terminal 100 in order to receive the user's voice operation input. In addition, examples of the first operation image and the second operation image will be described later.

The instruction execution unit 325 controls each component (each function) of the video apparatus 120 so that the actions corresponding to the operation instruction sent from the information terminal 100 are executed in accordance with the user's operation input that is input to the information terminal 100 via the touch operation image or the voice operation image.

Based on the above functions, the information terminal 100 and the video apparatus 120 in the embodiments perform the processing according to the flow shown in FIG. 4 below.

Figure 4:
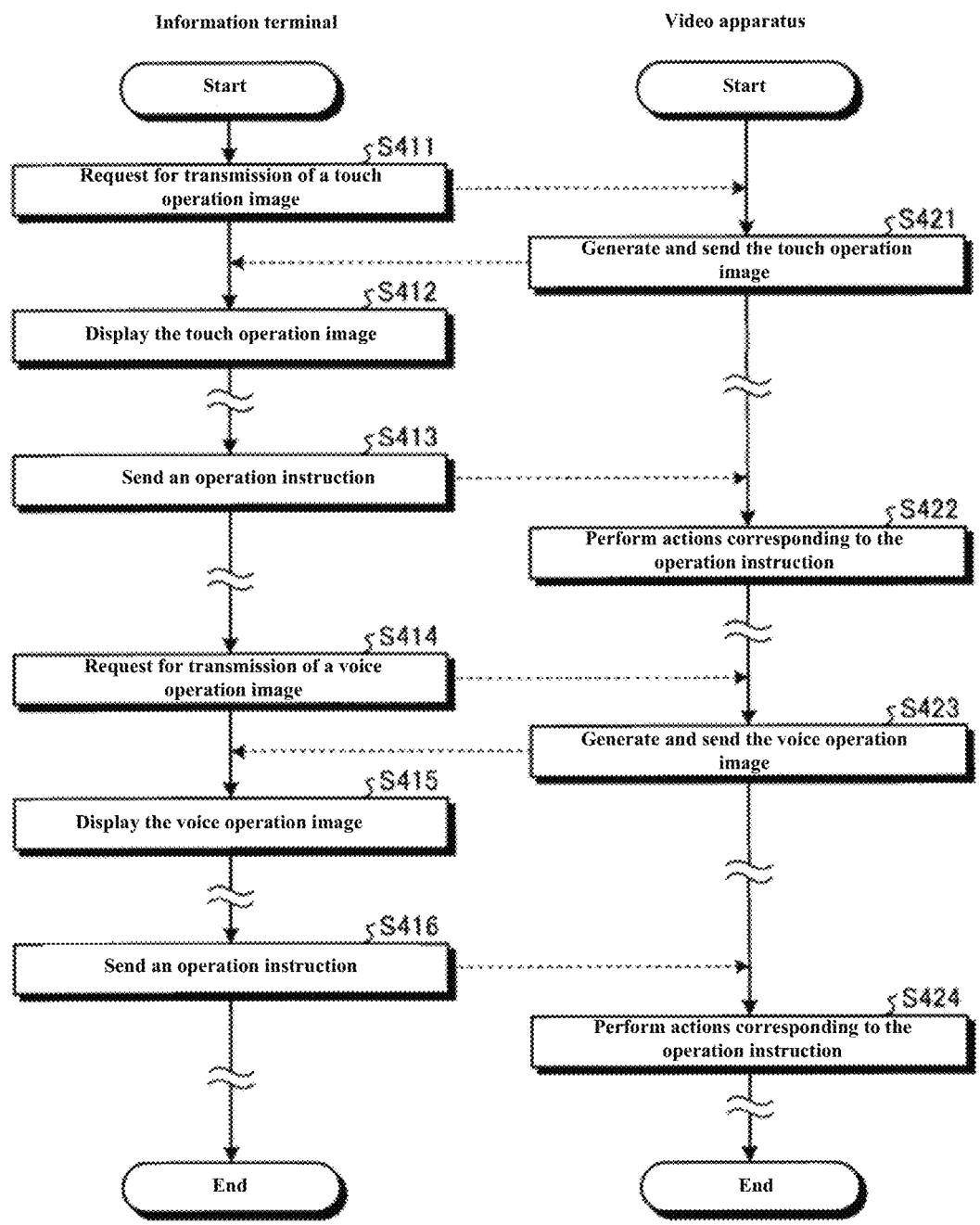
FIG. 4 is a schematic diagram showing the processing performed by the information terminal and the video apparatus in an embodiment in the form of a flowchart.

FIG. 4 is a schematic diagram showing the processing performed by the information terminal 100 and the video apparatus 120 in an embodiment.

As shown in FIG. 4, in some embodiments, first, the communication processing unit 311 of the information terminal 100 requests the video apparatus 120 for transmission of a touch operation image (the information required for the presentation of the touch operation image) when implementing the remote operation of the video apparatus 120 in S411. The processing of S411 is executed for example in a case when the user of the information terminal 100 runs an application for realizing the remote operation of the video apparatus 120 at the side of the information terminal 100 and performs a specified operation in the initial screen (for example, main menu, etc.) (not shown in the figure) provided by the application to the display 104*a*.

If the communication processing unit 321 of the video apparatus 120 receives the request from the information terminal 100, then the first operation image generation unit 323 of the video apparatus 120 generates a touch operation image (the information required for the presentation of the touch operation image) and the communication processing unit 321 of the video apparatus 120 sends the generated touch operation image to the information terminal 100 in S421. After that, if the communication processing unit 311 of the information terminal 100 receives the touch operation image from the video apparatus 120, then the display processing unit 312 of the information terminal 100 displays the received touch operation image on the display 104*a* in S412.

Here, an example of the touch operation image will be described together with the drawings.

Figure 5:
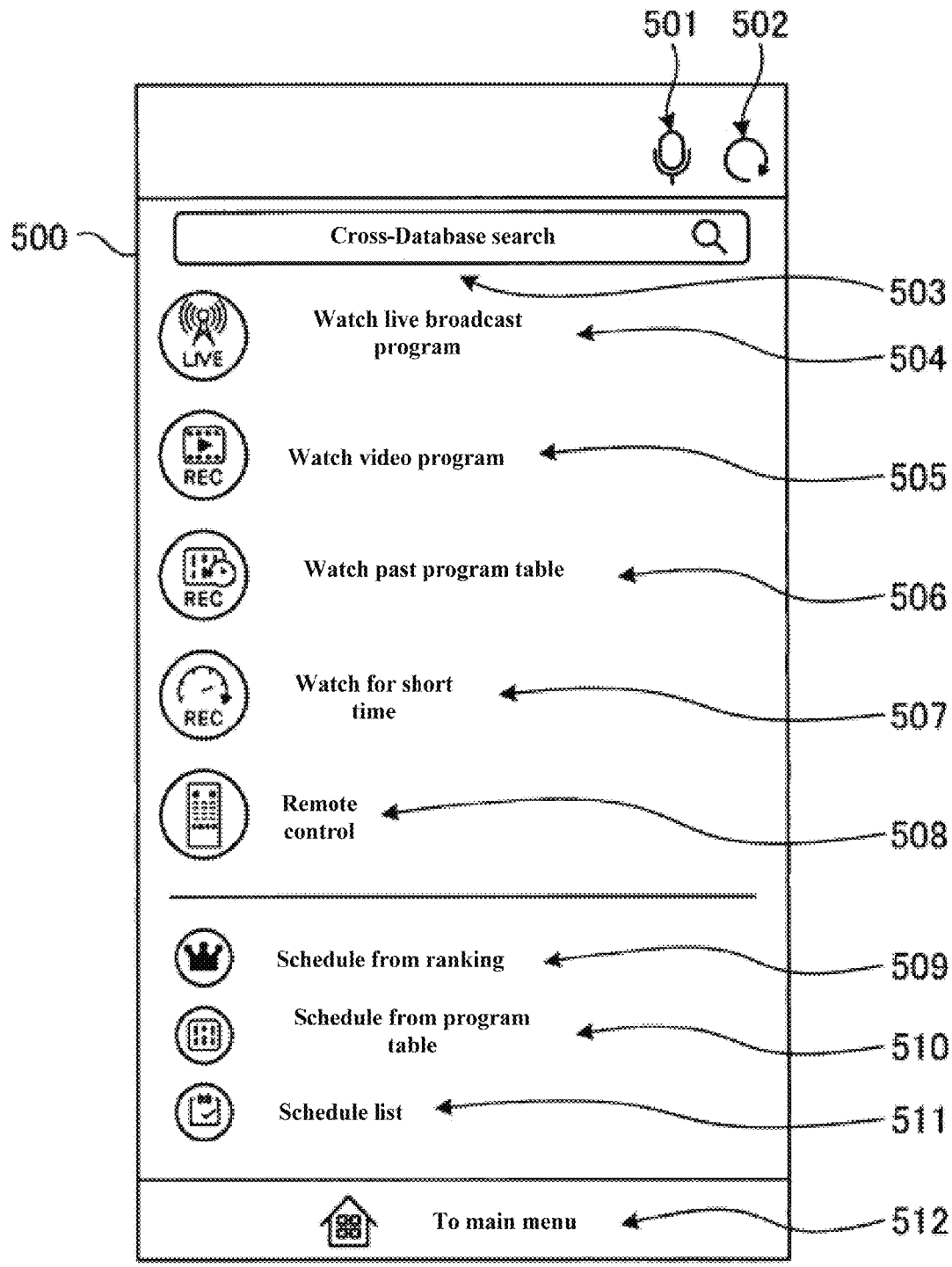
FIG. 5 is a schematic diagram showing an example of a touch operation image in an embodiment.

FIG. 5 is a schematic diagram showing an example of a touch operation image in an embodiment. The image 500 shown in FIG. 5 is displayed on the display 104*a* when the user of the information terminal 100 performs the predetermined operation via the initial screen provided by the above application.

As shown in FIG. 5, the items 501-512 that include buttons, icons or areas for indicating operation items are displayed in the image 500 as an example of the touch operation image, and the operation items receive manual operation inputs (touch or click inputs) corresponding to various operations on the video apparatus 120.

The item 501 is an item configured to receive a manual operation input for switching from a touch operation image to a voice operation image, and the item 502 is an item configured to receive a manual operation input for an update version of the touch operation image. These items 501 and 502 are provided by an application, which is an application running in the information terminal 100 in order to realize the remote operation of the video apparatus 120.

In some embodiments, the items 503-511 are items that receive manual operation inputs corresponding to various operations on the video apparatus 120. These items 503-511 are provided based on the information transmitted from the video apparatus 120 in accordance with a request for transmission of a touch operation image from the information terminal 100.

In some embodiments, the item 503 is an item for receiving a search operation in the content recorded in the video apparatus 120. The item 504 is an item for receiving an operation for displaying a live program (a list of programs) currently being received by the video apparatus 120 on the information terminal 100 or the video apparatus 120. And, the item 505 is an item for receiving an operation of displaying a video program (a list of programs) recorded in the video apparatus 120 on the information terminal 100 or the video apparatus 120.

In some embodiments, the item 506 is an item for receiving an operation for displaying a video program (a list of programs) recorded in the video apparatus 120 on the information terminal 100 or the video apparatus 120 in the form of program schedule. The item 507 is an item for receiving an operation of displaying a video program recorded in the video apparatus 120 on the information terminal 100 or the video apparatus 120 at a higher playback speed. And, the item 508 is an item for receiving an operation for displaying an image depicting the UI of the remote controller for operating the video apparatus 120 on the information terminal 100.

In some embodiments, the item 509 is an item that receives an operation of displaying the ranking of programs on the information terminal 100 or the video apparatus 120, wherein the programs are programs which have been scheduled for recording or watching and are provided by the server or the like collecting the information from the video apparatuses 120 in multiple locations. The item 510 is an item for receiving a program list downloaded from the server or the like and displaying it on the information terminal 100. And, the item 511 is an item for receiving an operation associated with a list of programs of schedule objects shown on the information terminal 100 or the video apparatus 120.

In some embodiments, the item 512 is an item for receiving an operation to show the initial screen of an application on the information terminal 100, the application is an application executed in the information terminal 100 in order to realize the remote operation of the video apparatus 120. The item 512 is also provided by the application in the same way as the aforementioned items 501 and 502.

Figure 6:
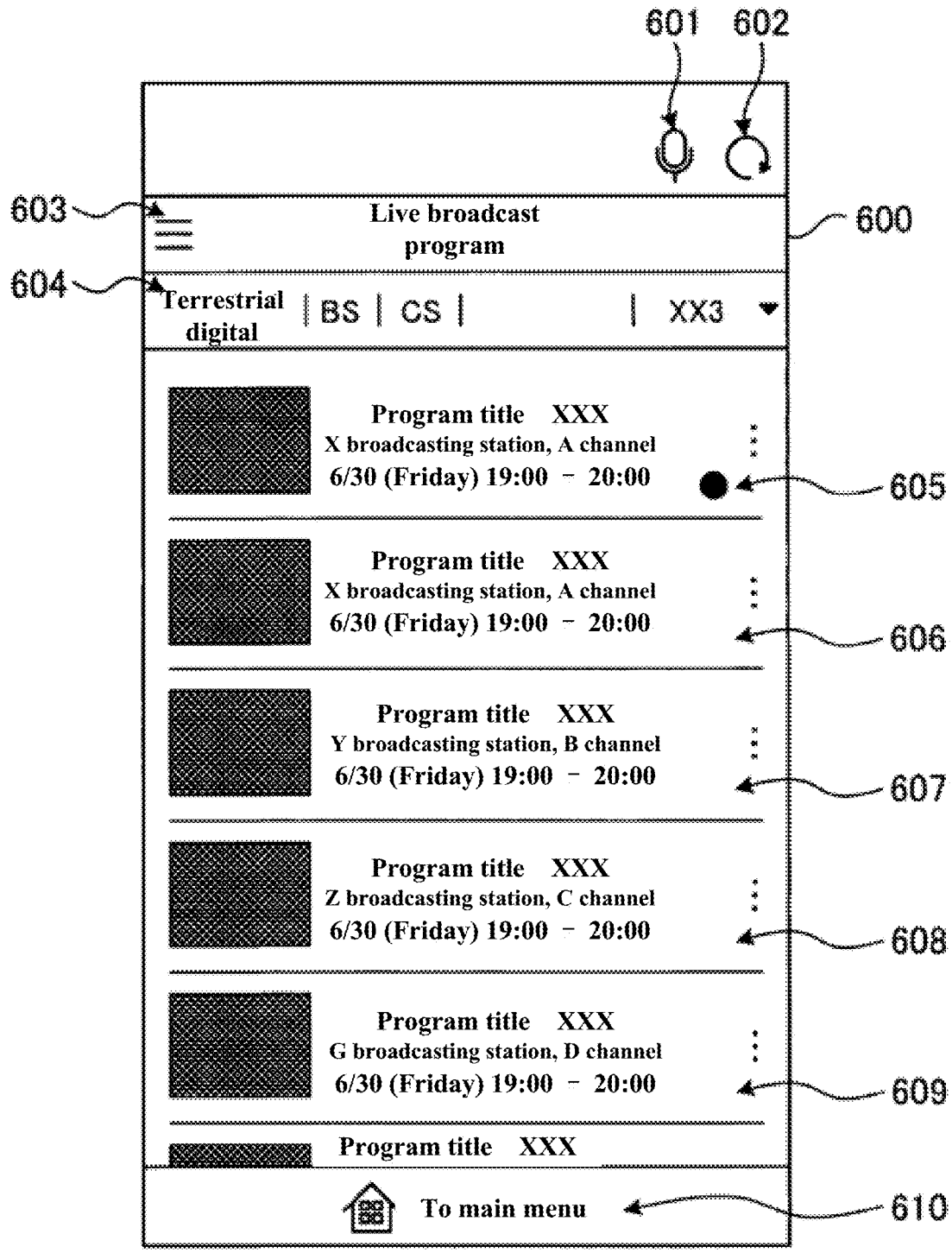
FIG. 6 is a schematic diagram showing another example of a touch operation image in an embodiment.

As another example of the touch operation image different from the image 500 shown in FIG. 5, the image 600 shown in FIG. 6 is given below.

FIG. 6 is a schematic diagram showing another example of a touch operation image in an embodiment. When a manual operation input for the item 504 is performed in the image 500 shown in FIG. 5, the image 600 shown in FIG. 6 is displayed on the display 104a of the information terminal 100 in a form of switching from the image 500. Therefore, a list of programs in at least one of terrestrial digital broadcast, BS (Broadcasting Satellites) broadcast and CS (Communication Satellites) broadcast are displayed in the image 600 shown in FIG. 6.

As shown in FIG. 6, the items 601-610 are displayed in the image 600 as another example of the touch operation image, similar to the image 500 shown in FIG. 5 described above. These items 601-610 include buttons, icons or areas for operation items that receive manual operation inputs (touch or click inputs) corresponding to various operations on the video apparatus 120.

The items 601, 602 and 610 are the same as the aforementioned items 501, 502 and 512 respectively, so the description thereof is omitted here.

The item 603 is an item that receives an operation for invoking a list of operation items same as the above image 500. And, the item 604 is an item that receives an operation for selecting to display a list of programs in the terrestrial digital broadcast in the image 600, or display a list of programs in the BS broadcast in the image 600, or display a list of programs in the CS broadcast in the image 600.

In some embodiments, the items 605-609 are items that receive an operation for selecting a program in the live broadcast on the video apparatus 120 from a list of programs in the broadcast corresponding to the selection result in the item 604. Therefore, the user of the information terminal 100 can perform the manual operation input (touch or click input) for any one of the items 605-609 so that the video apparatus 120 displays and plays the programs in the selected broadcast.

In this way, a plurality of operation items are displayed in the touch operation image in the embodiments, and the plurality of operation items are configured to receive manual operation inputs corresponding to operations on the video apparatus 120.

Therefore, referring back to FIG. 4, if a manual operation input for an operation item in the touch operation image is performed, the communication processing unit 311 of the information terminal 100 sends an operation instruction for causing the video apparatus 120 to perform the operation corresponding to the operation input to the video apparatus 120 in S413.

Then, if the communication processing unit 321 of the video apparatus 120 receives the operation instruction from the information terminal 100, the instruction execution unit 325 of the video apparatus 120 controls each component (each function) of the video apparatus 120 to perform the actions corresponding to the operation instruction in S422.

It should be noted that one of the objectives of embodiments is to reduce the load (degrees of difficulty) of the voice operation input for remotely operating the video apparatus 120 via the information terminal 100 and improve the convenience.

In some embodiments, when a predetermined condition is satisfied in the display of the touch operation image as the first operation image, the display processing unit 312 in the embodiments displays the voice operation image as the second operation image that can achieve the above purpose on the display 104a of the information terminal 100.

In some embodiments, referring back to FIG. 4, when a predetermined condition is satisfied in the display of the touch operation image, the communication processing unit 311 of the information terminal 100 requests the video apparatus 120 for transmission of a voice operation image (the information required for the display of the image) in S414. Then, in S423, the second operation image generation unit 324 of the video apparatus 120 generates a voice operation image (the information required for the display of the image) according to the request received from the information terminal 100, and the communication processing unit 321 of the video apparatus 120 transmits the voice operation image to the information terminal 100. Then, in S415, the display processing unit 312 of the information terminal 100 displays the voice operation image on the display 104a according to the voice operation image received from the video apparatus 120.

Here, an example of the voice operation image will be described in combination with the drawings.

Figure 7:
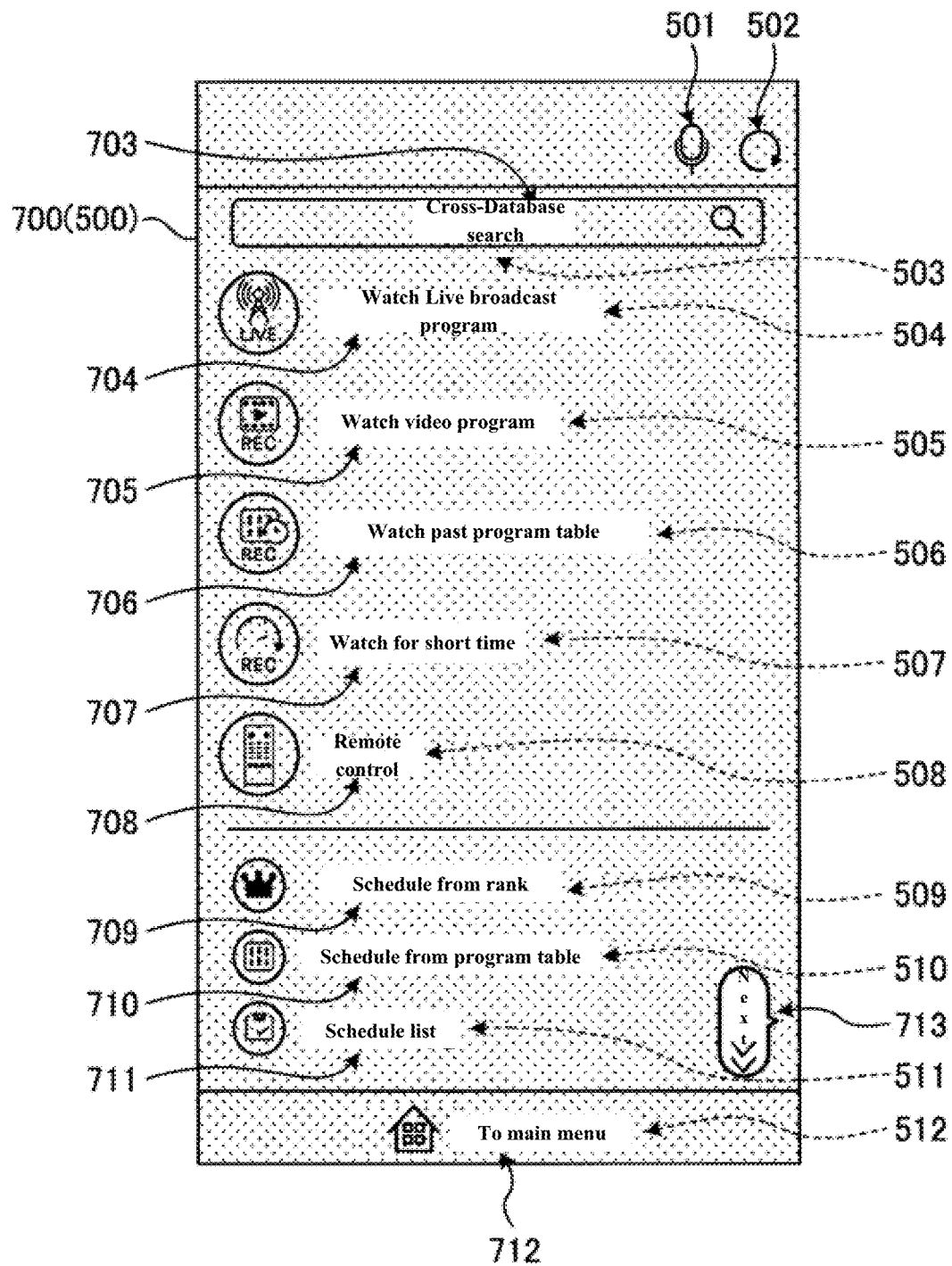
FIG. 7 is a schematic diagram showing an example of a voice operation image in an embodiment.

FIG. 7 is a schematic diagram showing an example of a voice operation image in an embodiment. The image 700 shown in FIG. 7 is configured to a certain degree of transparency, and is shown on the display 104a of the information terminal 100 overlaying with the image 500 when a manual operation input for the item 501 is performed in the image 500 shown in FIG. 5.

In some embodiments, an example where the image 700 having a certain degree of transparency is displayed on the display 104a overlaying with the image 500 is illustrated here. In some embodiments, the image 700 having no transparency may also be displayed on the display 104a in a form of switching from the image 500. Furthermore, in the embodiment, the overlay of the image 700 is not limited to the case where the manual operation input for the item 501 is performed, the case where the information terminal 100 moves towards a predetermined direction or position, or the case where a predetermined voice is input to the information terminal 100, etc., and can also be performed when a predetermined condition set in advance is satisfied.

As shown in FIG. 7, the items 703-712 are displayed in the image 700 that is an example of the voice operation image. The items 703-712 are configured to: highlight the text information (at least a part of the information) corresponding to the items 503-512 as operation items in the image 500 shown in FIG. 5 in the positions overlaying with the items 503-512.

In some embodiments, the item 703 is an item configured to highlight the text information (character string) such as "search" as a part of "Cross-Database search" in the item 503. In addition, the item 704 is an item configured to highlight the text information such as "live broadcast program" as a part of "watch live broadcast program" in the item 504. In addition, the item 705 is an item configured to highlight the text information such as "video program" as a part of "watch video program" in the item 505.

In some embodiments, the item 706 is an item configured to highlight the text information such as "past program table" as a part of "watch past program table" in the item 506. In addition, the item 707 is an item configured to highlight the text information such as "short time" as a part of "watch for short time" in the item 507. In addition, the item 708 is an item configured to highlight all the text information of the "remote control" in the item 508.

In some embodiments, the item 709 is an item configured to highlight the text information such as "ranking" as a part of "schedule from ranking" in the item 509. The item 710 is an item configured to highlight the text information such as "program table" as a part of "schedule from program table" in the item 510. The item 711 is an item configured to highlight all the text information of the "schedule list" in the item 511. And, the item 712 is an item configured to highlight the text information such as "main menu" as a part of "to main menu" in the item 512.

The text information highlighted in the above-mentioned items 703-712 functions as the guidance (keywords) for the voice operation input. Therefore, by inputting the text information highlighted in the items 703-712 as voice to the information terminal 100 while viewing the image 700, the user can obtain the same result as that when the manual operation inputs are performed on the items 503-512.

Figure 8:
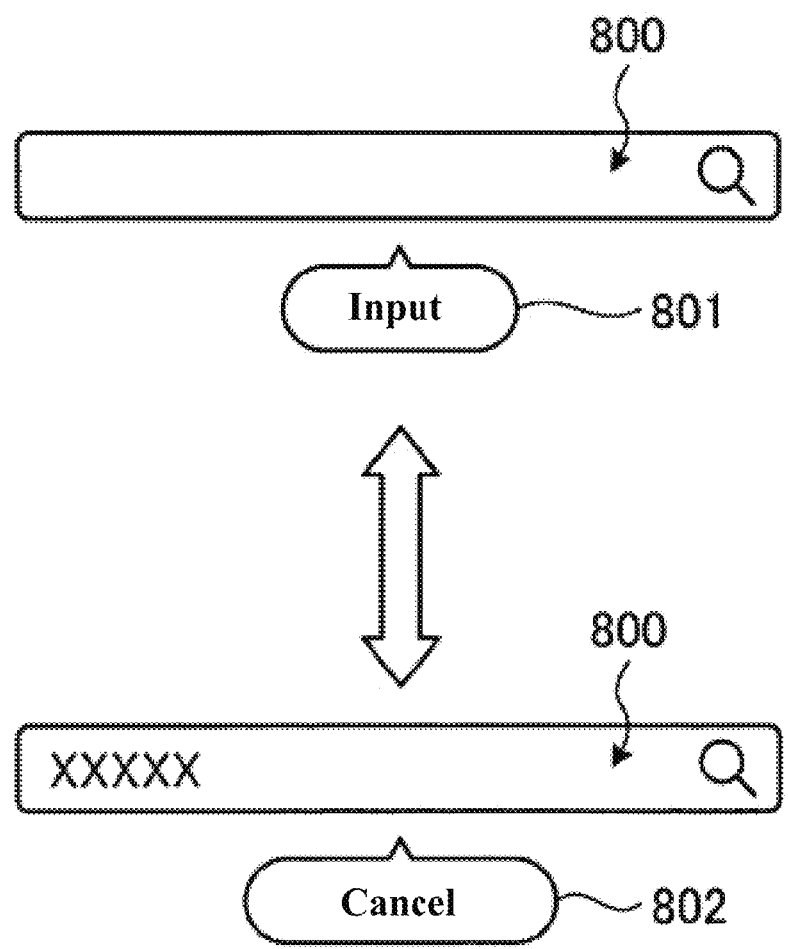
FIG. 8 is a schematic diagram for describing the search via a voice operation image in an embodiment.

In some embodiments, if the text information such as "search" in the item 703 is input as voice to the information terminal 100, the display of the item 703 changes as shown in FIG. 8 below.

FIG. 8 is a schematic diagram for describing a search via a voice operation image in an embodiment.

As shown in FIG. 8, the text information such as "search" is input as voice to the information terminal 100 in the image 700 shown in FIG. 7, the search box 800 is empty, and a bubble-shape item 801 including the text information such as "input" for prompting inputting a search word input is displayed in the vicinity of the search box 800. In such a configuration, after uttering the text information such as "input" in the item 801, the user can input a search word in the search box 800 by uttering the search word. In addition, after the search word is input, a bubble-shape item 802 comprising the text information such as "cancel" for canceling the input of the search word is displayed in the vicinity of the search box 800 instead of the above item 801.

Referring back to FIG. 7, the item 713 that is not displayed in the image 500 is displayed in the image 700. The item 713 is an item that receives an operation for scrolling the image 700. Similar to the above items 703-712, the item 713 also highlights the text information such as "next" as a guide for the voice operation input. Therefore, the user can scroll the image 700 by inputting the text information such as "next" highlighted in the item 713 in voice to the information terminal 100.

In some embodiments, the items 703-712 are configured to highlight the text information that is the keyword of the voice-based operation input, thereby reducing the load (degrees of difficulties) of the voice operation input and improving the convenience. And, the positions of the items 703-712 are overlaid with the positions of the items 503-512, thereby further improving the convenience.

In some embodiments, the text information as the keyword of the voice operation input is predetermined. Therefore, the corresponding operation is performed only when the highlighted text information is input in the form of voice, and no operation is performed when the text information other than the highlighted text information is input in voice.

Of course, it is beneficial to allow a little tolerance for the dialects in different regions. Therefore, the following configuration may be adopted in some embodiments: multiple modes of text information predetermined as keywords for voice operation inputs are prepared, and for a case where one of the multiple modes of text information is input in the form of voice, a corresponding operation is performed. For example, the text "short time" in the item 507 corresponds to a keyword such as "Jidan (Japanese pronunciation)" in addition to a keyword such as "Yidan (Japanese pronunciation)" which is a standard pronunciation.

Moreover, the voice operation image is not limited to the image 700 described above. In some embodiments, there is also an image 900 shown in FIG. 9 below, as a voice operation image corresponding to the image 600 shown in FIG. 6.

Figure 9:
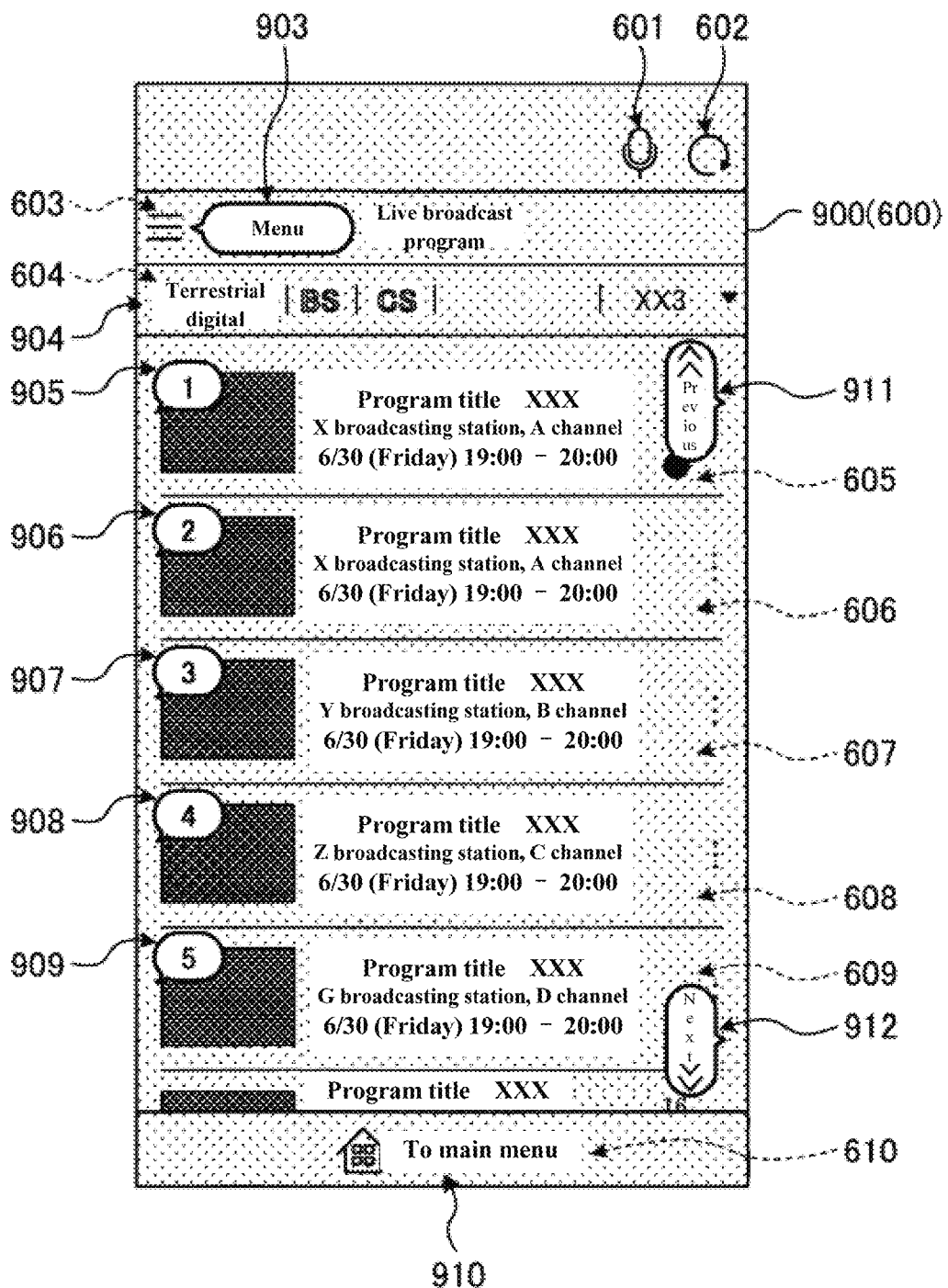
FIG. 9 is a schematic diagram showing another example of a voice operation image in an embodiment.

FIG. 9 is a schematic diagram showing another example of a voice operation image in an embodiment. When the voice operation input corresponding to the text information such as "live program" of the item 704 is performed in the image 700 shown in FIG. 7, or when the manual operation input for the item 601 is performed in the image 600 shown in FIG. 6, the image 900 shown in FIG. 9 is presented on the display 104a of the information terminal 100.

The image 900 shown in FIG. 9 has a certain degree of transparency similar to the image 700 shown in FIG. 7 and is presented on the display 104a of the information terminal 100 in a form of overlapping or overlaying with the image 600 shown in FIG. 6. Therefore, like the image 600 shown in FIG. 6, the image 900 shown in FIG. 9 also displays a list of programs from at least any one of terrestrial digital broadcast, BS broadcast and CS broadcast in a visual form.

As shown in FIG. 9, the items 903-910 corresponding to the items 603-610 as the operation items in the image 600 shown in FIG. 6 as well as the items 911 and 912 that do not correspond to the operation items of the image 600 shown in FIG. 6 are presented in the image 900 as another example of the voice operation image.

In some embodiments, the item 903 is an item configured to highlight the text information like "menu" as guidance for voice input to realize the same operation as the above item 603 (referring to FIG. 6) by surrounding it with a bubble box near the item 603. Therefore, by inputting the text information such as "menu" by voice, the user can obtain the same result as the case where the manual operation input is performed on the above item 603 (referring to FIG. 6).

In some embodiments, the item 904 is an item configured to highlight the text information like "terrestrial digital", "BS" and "CS" as guidance for voice input to realize the same operation as the above item 604 (referring to FIG. 6) in the position overlapping or overlaying with the original item 604. Therefore, by inputting any text information among "terrestrial digital", "BS" and "CS" by voice, the user can select whether to display a list of programs from the terrestrial digital broadcast in the image 900, or display a list of programs from the BS broadcast in the image 900, or display a list of programs from the CS broadcast in the image 900.

In some embodiments, the items 905-909 are items configured to highlight the text information as guidance for voice input to realize the same operations as the above items 605-609 (referring to FIG. 6) by surrounding it with a bubble box. And, the text information highlighted in the items 905-909 is configured as the simple (short) text information that is not related to the corresponding program title and comprises numbers and words alone or in combination.

Generally, the program title changes variously, so the text information representing the program title is often inappropriate as guidance for voice input. In this regard, this embodiment highlights the simple (short) text information as guidance for voice input as described above, thereby improving the convenience.

In some embodiments, the item 910 is the same item as the above item 710 (referring to FIG. 7). Therefore, if the text information such as "main menu (or home screen)" highlighted in the item 910 is input by voice, the home screen of the application run in the information terminal 100 is presented on the information terminal 100.

In some embodiments, the items 911 and 912 are items for receiving an operation of scrolling the image 900. For example, if the text information such as "previous" highlighted in the item 911 is input by voice, the image 900 scrolls upward; and if the text information such as "next" highlighted in the item 912 is input by voice, the image 900 scrolls downward.

Thus, it is also possible to perform an operation equivalent to the manual operation input for the touch operation image through the voice operation input for the voice operation image in this embodiment.

Therefore, referring back to FIG. 4, if a voice operation input corresponding to the text information highlighted in the voice operation image is performed, the communication processing unit 311 of the information terminal 100 sends an operation instruction for causing the video apparatus 120 to perform the operation corresponding to the operation input to the video apparatus 120 in S415. In some embodiments, when the voice operation input is not performed for a certain period of time during the display of the voice operation image, the switching from the voice operation image to the touch operation image can be performed.

And, if the communication processing unit 321 of the video apparatus 120 receives an operation instruction from the information terminal 100, the instruction execution unit 325 of the video apparatus 120 controls each component (each function) of the video apparatus 120 to perform the actions corresponding to the operation instruction in S424.

Moreover, the above group of functional modules shown in FIG. 3 is implemented by the cooperation of hardware and software as a result of the CPU 107 executing a predetermined application stored in the memory 108 or the like in this embodiment. However, at least a part of the above group of functional modules shown in FIG. 3 may also be implemented as the dedicated hardware (circuit) in this embodiment.

The above application may be provided in a state of being pre-loaded in a storage device such as the memory 108, or may be provided as computer program products recorded in a form that can be installed or in a form that can be executed in the storage medium, the storage medium is a computer-readable non-transitory storage medium such as various magnetic disks (such as floppy disk) or various optical disks (such as Digital Versatile Disk, DVD).

In some embodiments, the above application may also be provided or launched via a network such as Internet. That is, the above application may also be provided in the form of being stored on a computer connected to a network such as Internet and downloaded from the computer via the network.

As described above, the information terminal 100 of this embodiment includes the display processing unit 312 and the voice operation processing unit 314.

The display processing unit 312 is configured to: display a touch operation image (referring to FIGS. 5 and 6) as a first operation image that displays an operation item for receiving a manual operation input corresponding to an operation on the video apparatus 120 on the display unit 104 (display 104a), and display a voice operation image (referring to FIGS. 7 and 9) as a second operation image that highlights the text information corresponding to the operation item in the touch operation image on the display unit 104 when a predetermined condition is satisfied in the display of the touch operation image. And, the voice operation processing unit 314 is configured to: receive a voice operation input corresponding to the text information highlighted in the voice operation image as an operation on the video apparatus 120 during the presentation of the voice operation image.

According to the above-mentioned configuration, when a voice operation input is performed on the information terminal 100 in order to operate the video apparatus 120, the text information highlighted in the voice operation image can be used as a guide for the voice operation input. Therefore, the load (degrees of difficulty) of the voice operation input to the information terminal 100 can be reduced, and the convenience can be improved.

Here, in some embodiments, the voice operation processing unit 314 is configured to: receive only the voice operation input corresponding to the text information highlighted in the voice operation image as an operation on the video apparatus 120 (without receiving a voice operation utterance different from the voice utterance corresponding to the text information highlighted in the voice operation image as an operation on the video apparatus 120). According to such a configuration, only when performing an accurate voice operation input, the video apparatus 120 can be operated.

Furthermore, in some embodiments, the voice operation processing unit 314 associates the voice operation input with the voice mode corresponding to the text information highlighted in the second operation image, and establishes a correspondence between the voice mode and the operation on the video apparatus 120. According to such a configuration, the correspondence between the voice operation input and the operation on the video apparatus 120 can be easily established. Therefore, for example, when the voice mode of the text information varies by region due to dialects or the like, the correspondence between voices in these different modes and the same operation can be established. For example, the first voice mode "hi ga si da you ji o ken sa ku (Japanese pronunciation)", the second voice mode "si ga si da you ji o ken sa ku (Japanese pronunciation)" and the third voice mode "su ga su da you ji o ken sa ku (Japanese pronunciation)" are different from each other, but it is believed that the difference is simply an error due to dialect. Therefore, it is beneficial to establish a correspondence between these three voice modes and a specific personal voice operation input such as "Search hi ga si da you ji" used to search hi ga si da you ji (Japanese pronunciation).

In other words, in some embodiments, the voice operation processing unit 314 may be configured to: establish a correspondence between voice utterances in a plurality of modes and the voice corresponding to the text information highlighted in the voice operation image, and receives an operation input among the voice utterances in the plurality of modes as an operation on the video apparatus 120 that corresponds to the voice operation input corresponding to the text information highlighted in the voice operation image. According to such a configuration, the appropriate processing is possible for example when there are multiple voice modes of the text information by region due to dialects or the like.

Moreover, in some embodiments, the display processing unit 312 is configured to be able to: on the voice operation image, highlight the text information corresponding to the operation item in the touch operation image in an overlapping or overlaying position with the operation item in the touch operation image. According to such a configuration, the correspondence between the voice operation input via the voice operation image and the manual operation input via the touch operation image can be easily recognized.

Furthermore, in some embodiments, the display processing unit 312 is further configured to be able to highlight the text information corresponding to the operation item in the touch operation image in a position near the operation item in the touch operation image in a state of being surrounded by a bubble box on the voice operation image. According to such a configuration, the correspondence between the voice operation input via the voice operation image and the manual operation input via the touch operation image can also be easily recognized.

Furthermore, in some embodiments, the display processing unit 312 is configured to: display the text information in the voice operation image as identification information comprising at least one of predetermined words and numbers alone or in combination when the operation item displayed in the touch operation image corresponds to an operation on the content (the above-mentioned live program, recorded program, etc.) that should be output from the video apparatus 120. According to such a configuration, for example the operations on the content such as display play and stop can be easily performed by using the identification information during the voice operation input.

Furthermore, in some embodiments, the display processing unit 312 displays the voice operation image superimposed on the touch operation image in a display state in which the operation item in the touch operation image penetrates through the voice operation image. According to such a configuration, the correspondence between the operation item displayed in the touch operation image and the text information highlighted in the voice operation image can be easily recognized.

<Variants>

Moreover, the configuration in which the voice operation image having transparency is displayed in a form of being superimposed on the touch operation image is exemplified in the above-mentioned embodiments. However, a voice operation image having no transparency may be also displayed in a form of switching from the touch operation image as long as it is a configuration in which the text information is highlighted as guidance for a voice operation input.

Furthermore, the configuration in which the text information in the voice operation image is highlighted in a position overlapping with or near the operation item in the touch operation image is exemplified in the above-described embodiments. However, even if the text information and the operation item are located in separate locations, the effect of reducing the load (degrees of difficulty) of the voice operation input to the information terminal 100 and improving the convenience can be obtained as long as the text information as guidance for the voice operation input is highlighted.

Furthermore, the configuration in which the text information corresponding to the operation on the content is displayed as the identification information including at least one of predetermined words and numbers alone or in combination is exemplified in the above-described embodiments. However, the entire content title may also be highlighted in the voice operation image as the text information that becomes guidance for the voice operation input as long as the content title or the like can be obtained.

The embodiments and variants of the present application are illustrated above, but the above-mentioned embodiments and variants are just examples and not intended to limit the scope of the present application. The new embodiments and variants described above can be implemented in various forms, and various omissions, substitutions and modifications can be made without departing from the scope of the substance of the present application. The embodiments and variants described above are included in the scope and spirit of the present application, and shall fall within the scope of the disclosure.

What is claimed is:

1. An electronic device, comprising:
a display processing unit configured to:
display a first operation image, comprising presentation of an operation item for operation input, on a display unit; and
display a second operation image on the display unit in response to the first operation image satisfying a predetermined condition; wherein the second operation image is an operation image in which text information corresponding to the operation item in the first operation image is highlighted; and
a voice operation processing unit configured to:
receive a voice operation input corresponding to the text information highlighted in the second operation image as an operation on a video apparatus while the second operation image is displayed, %
correspond the text information highlighted in the second operation image to voice utterances in multiple voice modes,
associate the voice operation input with the voice utterances in multiple voice modes corresponding to the text information highlighted in the second operation image, and
establish a correspondence between the voice utterances in multiple voice modes and the operation on the video apparatus.

2. The electronic device according to claim 1, wherein:
the voice operation processing unit is configured to receive only the voice operation input corresponding to the text information highlighted in the second operation image as the operation on the video apparatus without receiving a voice operation utterance different from the voice utterance corresponding to the text information highlighted in the second operation image as an operation on the video apparatus.

3. The electronic device according to claim 1, wherein:
the voice operation processing unit is configured to establish a correspondence between the voice utterances in multiple voice modes and a reference voice corresponding to the text information highlighted in the second operation image,
wherein, in response to the voice operation input being one of the reference voice and any voice utterance, the operation on the video apparatus is performed.

4. The electronic device according to claim 1, wherein:
the display processing unit is configured to highlight the text information corresponding to the operation item in the first operation image in an overlapping position with the operation item in the first operation image on the second operation image.

5. The electronic device according to claim 1, wherein:
the display processing unit is configured to highlight the text information corresponding to the operation item in the first operation image in a state of being surrounded by a bubble box on the second operation image.

6. The electronic device according to claim 1, wherein the display processing unit is configured to:
in a case where the operation item displayed in the first operation image corresponds to an operation on content that is to be output to the video apparatus, highlight the text information in the second operation image in a form containing identification information, the identification information comprising a word, a number, or a combination thereof, which are predetermined, unassociated with the content to be output to the video apparatus, and used for the voice operation input.

7. The electronic device according to claim 1, wherein:
the display processing unit is configured to display the second operation image, which has a degree of transparency of an entire second operation image, superimposed on the first operation image, in a display state where the text information corresponding to the operation item in the first operation image is highlighted through the second operation image at a corresponding position after the second operation image is superimposed on the first operation image.

8. The electronic device according to claim 2, wherein:
the display processing unit is configured to highlight the text information corresponding to the operation item in the first operation image in an overlapping position with the operation item in the first operation image on the second operation image.

9. The electronic device according to claim 3, wherein:
the display processing unit is configured to highlight the text information corresponding to the operation item in the first operation image in an overlapping position with the operation item in the first operation image on the second operation image.

10. The electronic device according to claim 2, wherein:
the display processing unit is configured to highlight the text information corresponding to the operation item in the first operation image in a state of being surrounded by a bubble box on the second operation image.

11. The electronic device according to claim 3, wherein:
the display processing unit is configured to highlight the text information corresponding to the operation item in the first operation image in a state of being surrounded by a bubble box on the second operation image.

12. The electronic device according to claim 2, wherein the display processing unit is configured to:
in a case where the operation item displayed in the first operation image corresponds to an operation on content that is to be output to the video apparatus, highlight the text information in the second operation image in a form containing identification information, the identification information comprising a word, a number, or a combination thereof, which are predetermined, unassociated with the content to be output to the video apparatus, and used for the voice operation input.

13. The electronic device according to claim 3, wherein the display processing unit is configured to:
in a case where the operation item displayed in the first operation image corresponds to an operation on content that is to be output to the video apparatus, highlight the text information in the second operation image in a form containing identification information, the identification information comprising a word, a number, or a combination thereof, which are predetermined, unassociated with the content to be output to the video apparatus, and used for the voice operation input.

14. The electronic device according to claim 4, wherein the display processing unit is configured to:
in a case where the operation item displayed in the first operation image corresponds to an operation on content that is to be output to the video apparatus, highlight the text information in the second operation image in a form containing identification information, the identification information comprising a word, a number, or a combination thereof, which are predetermined, unassociated with the content to be output to the video apparatus, and used for the voice operation input.

15. The electronic device according to claim 5, wherein the display processing unit is configured to:
in a case where the operation item displayed in the first operation image corresponds to an operation on content that is to be output to the video apparatus, highlight the text information in the second operation image in a form containing identification information, the identification information comprising a word, a number, or a combination thereof, which are predetermined, unassociated with the content to be output to the video apparatus, and used for the voice operation input.

16. The electronic device according to claim 2, wherein:
the display processing unit is configured to display the second operation image, which has a degree of transparency of an entire second operation image, superimposed on the first operation image, in a display state where the text information corresponding to the operation item in the first operation image is highlighted through the second operation image at a corresponding position after the second operation image is superimposed on the first operation image.

17. The electronic device according to claim 3, wherein:
the display processing unit is configured to display the second operation image, which has a degree of transparency of an entire second operation image, superimposed on the first operation image, in a display state where the text information corresponding to the operation item in the first operation image is highlighted through the second operation image at a corresponding position after the second operation image is superimposed on the first operation image.

18. The electronic device according to claim 4, wherein:
the display processing unit is configured to display the second operation image, which has a degree of transparency of an entire second operation image, superimposed on the first operation image, in a display state where the text information corresponding to the operation item in the first operation image is highlighted through the second operation image at a corresponding position after the second operation image is superimposed on the first operation image.

19. The electronic device according to claim 5, wherein:
the display processing unit is configured to display the second operation image, which has a degree of transparency of an entire second operation image, superimposed on the first operation image, in a display state where the text information corresponding to the operation item in the first operation image is highlighted through the second operation image at a corresponding position after the second operation image is superimposed on the first operation image.

20. A computer-readable non-transitory storage medium, wherein the storage medium stores programs configured to cause a computer to:
display a first operation image comprising presentation of an operation item for operation input on a display unit, and display a second operation image on the display unit in response to the first operation image satisfying a predetermined condition, wherein the second operation image is an operation image in which text information corresponding to the operation item displayed in the first operation image is highlighted;
receive a voice operation input corresponding to the text information highlighted in the second operation image as an operation on a video apparatus while the second operation image is displayed,
correspond the text information highlighted in the second operation image to voice utterances in multiple voice modes,
associate the voice operation input with the voice utterances in multiple voice modes corresponding to the text information highlighted in the second operation image, and
establish a correspondence between the voice utterances in multiple voice modes and the operation on the video apparatus.

* * * * *